United States Patent

[11] 3,580,098

| | | |
|---|---|---|
| [72] | Inventor | Albert Goad<br>Hemel Hempstead, England |
| [21] | Appl. No. | 819,352 |
| [22] | Filed | Apr. 25, 1969 |
| [45] | Patented | May 25, 1971 |
| [73] | Assignee | Rotax Limited<br>London, England |
| [32] | Priority | Apr. 29, 1968 |
| [33] | | Great Britain |
| [31] | | 20134/68 |

[54] BALL SCREW AND NUT MECHANISM
3 Claims, 4 Drawing Figs.

[52] U.S. Cl. ................................................. 74/459
[51] Int. Cl. .........................................F16h 55/22,
F16h 1/18
[50] Field of Search............................................ 74/459

[56] References Cited
UNITED STATES PATENTS

| 2,519,777 | 8/1950 | Cochrane..................... | 74/459 |
| 3,143,896 | 8/1964 | Edwards....................... | 74/459 |
| 3,234,810 | 2/1966 | Orner........................... | 74/459 |
| 3,306,124 | 2/1967 | Adams......................... | 74/459 |
| 3,327,551 | 6/1967 | Prueter......................... | 74/459 |

*Primary Examiner*—Leonard H. Gerin
*Attorney*—Holman & Stern

ABSTRACT: A ball screw and nut mechanism including an insert which is positioned within a recess in the nut, the insert defining scoop portions which depend into the groove in the screw, the scoop portions being interconnected by a passage whereby balls can recirculate during relative angular movement of the nut and screw.

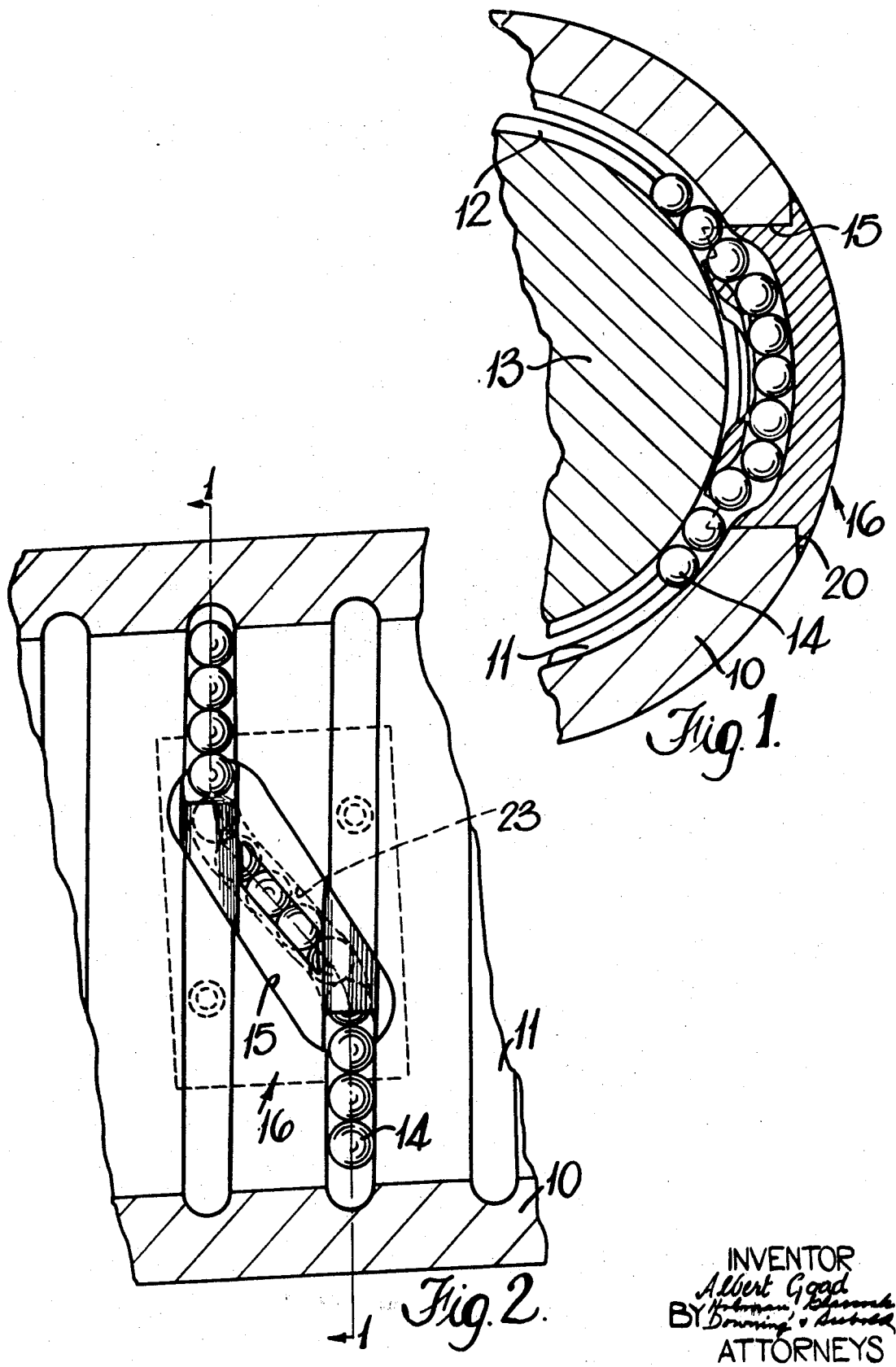

BALL SCREW AND NUT MECHANISM

This invention relates to ball screw and nut mechanism of the kind comprising a screw having a helical groove formed thereon, a complementarily grooved nut surrounding said screw, a plurality of balls running in said grooves and means for returning the balls from one end to the other end of the groove whereby recirculation of the balls through the groove is obtained during relative angular movement of the screw and nut.

The object of the invention is to provide such a mechanism in a simple and convenient form.

According to the invention in a ball screw and nut mechanism of the kind specified said means comprises an insert having a body portion mounted within a recess defined in the nut, said body portion defining a passage through which the balls can pass between the ends of said groove, said body portion also defining scoop portions at the ends of said passage respectively, said scoop portions extending into the groove of the screw, and the body portion being formed as two substantially identical parts each part defining a portion of said passage and portions of said scoop portions.

Figure 3:
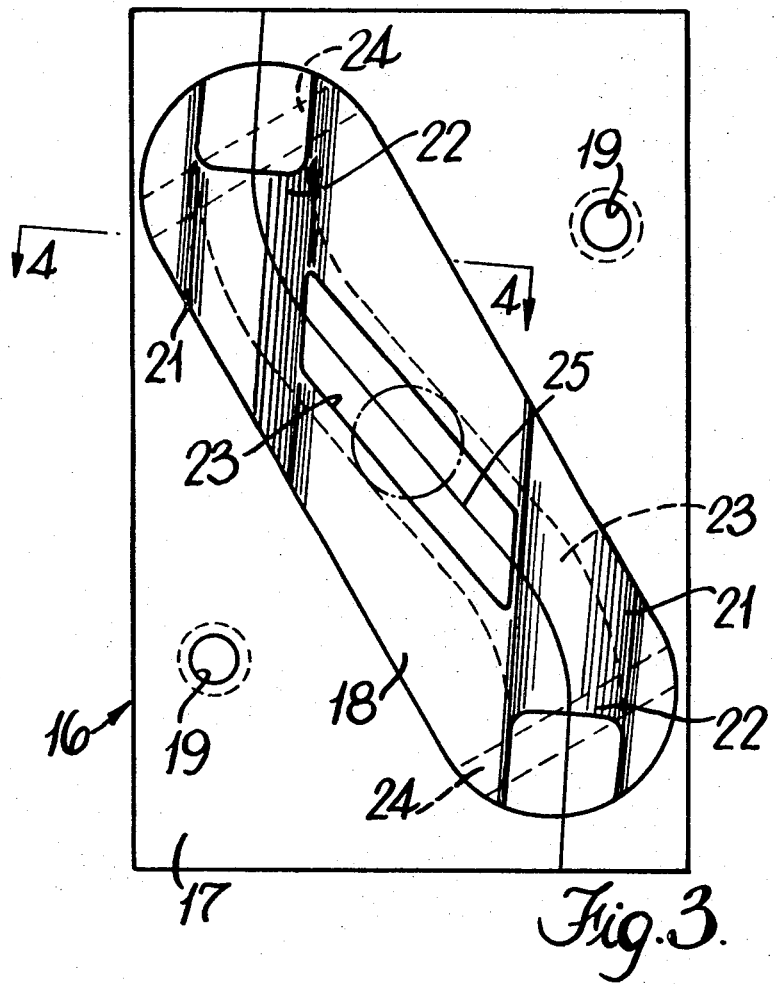
Figure 4:

In the accompanying drawings:

FIG. 1 is a sectional side elevation of part of a ball screw and nut in accordance with the invention, the section being taken on the line 1-1 of FIG. 2, FIG. 2 is a view of the inside surface of part of the nut, FIG. 3 is a view of an insert mounted in the nut and, FIG. 4 is a part section on the line 4-4 of FIG. 3.

Referring to the drawings there is provided a hollow cylindrical nut member 10 on the internal periphery of which is formed a helical groove 11 of hemispherical section and complementary to a groove 12 formed on a shaft 13 extending through the nut member. Engaged within the grooves are a plurality of balls 14 and the arrangement is such that as relative rotation is imparted to the nut member and shaft relative axial movement will occur therebetween and the balls will roll along the grooves.

In order to provide for recirculation of the balls 14 there is formed in the wall of the nut member an elongated recess 15 inclined relative to a plane normal to the axis of the shaft and in which is mounted an insert 16. The insert 16 defines a passage through which the balls can pass so that they are transferred between the ends of the portions of the grooves. The insert 16 comprises a base portion 17 and a body portion 18 upstanding from the base portion the two portions being integral although the insert as a whole is made in two parts as will be described. The base portion 17 is substantially square and its face remote from the body portion 18 is contoured to the external surface of the nut member 10. Furthermore, the base portion is provided with a pair of locating holes 19 in which are mounted screws engaged in the nut member, the base portion being positioned within a locating recess 20 formed in the outer peripheral surface of the nut member. The body portion 18 is elongated in form and extends through the aforesaid elongated recess 15.

A substantial area of the face of the body portion 18 of the insert remote from the base portion 17 is cylindrical and lies adjacent to the periphery of the shaft 13. At the opposite ends respectively of the body portion are formed a pair of shaped projections 21 which extend into the adjacent portions of the groove 12 of the shaft. These projections are complementary in shape to the groove but their size is such that a running clearance is established with the shaft. The inclination and the length of the body portion of the insert between the projections thereof, is chosen so that the groove in the nut member has the appropriate length. For instance as is shown, the projections 21 may extend into adjacent convolutions of the groove 12 on the shaft in which case the effective length of the corresponding groove 11 on the nut will be less than the circumference of the nut. On the other hand there may be several convolutions between the projections.

The outwardly facing faces of the projections 21 define scoop portions 22 respectively and formed within the body portion is a passage 23 the ends of which terminate on said faces respectively. The arrangement is such that during relative angular movement of the nut member and the shaft the balls are lifted out of the groove in the shaft by the action of the leading scoop portion 22 whereafter they pass through the passage 23 and are deposited in the groove adjacent the trailing scoop portion. During relative rotation in the opposite direction the roles of the scoop portions are reversed. In passing through the passage the balls move outwardly and then move in an axial and circumferential direction clear of the surface of the shaft i.e. the crest portion between adjacent convolutions of the groove 12, before moving inwardly.

The insert 16 as mentioned previously, is formed in two parts which prior to assembly into the aforesaid recesses are joined together in any convenient manner such for instance by the use of pins 24. The joint between the two parts follows the path of movement of the balls 14 in the passage 23 of the insert and the two parts of the insert are identical. The joint line is indicated at 25 in FIG. 3. In each part there is formed in the joint face thereof a hemispherical groove which when the parts are in assembled relationship defines with the groove of the other part the passage 23 and the groove can be formed using a controlled milling cutter of the appropriate shape. As shown, the portion of the passage 23 between the projections 21 is open to the periphery of the shaft but the position of the edges of the passage is such that during the axial and circumferential movement of the balls they are maintained out of contact with the shaft 13. It will be understood however, that the passage can be completely closed.

Having thus described my invention what I claim as new and desire to secure by Letters Patent is:

1. A ball screw and nut mechanism of the kind comprising a screw member, a nut member surrounding the screw member, a helical groove defined by the members, a plurality of balls located in said groove, means for transferring the balls from one position in the helical groove to another position therein, said means comprising an insert which is located within a recess formed in the nut, a body portion defining a part of the insert, a pair of spaced projections defined on the body portion and which are complementarily in shape to the portion of the groove defined by the screw member, said insert being formed as two identical parts, a pair of helispherical grooves formed in the parts of the insert defining the body portion, said hemispherical grooves when the two parts are in abutting relationship defining a passage through which the balls pass between said positions in the helical groove, the passage extending into said projections and the latter at the entry to said passage defining scoop portions which guide the balls during their passage from and into said helical groove.

2. A ball screw and nut mechanism as claimed in claim 1 including fastening means for retaining said parts of the insert in assembled relationship.

3. A ball screw and nut mechanism as claimed in claim 2 in which said fastening means comprises a pair of pins engaging within the parts of the body portion of the insert.